Sept. 6, 1938.  S. SEGAL  2,129,632
CLOTH CUTTING MACHINE
Filed Dec. 7, 1937  4 Sheets-Sheet 1
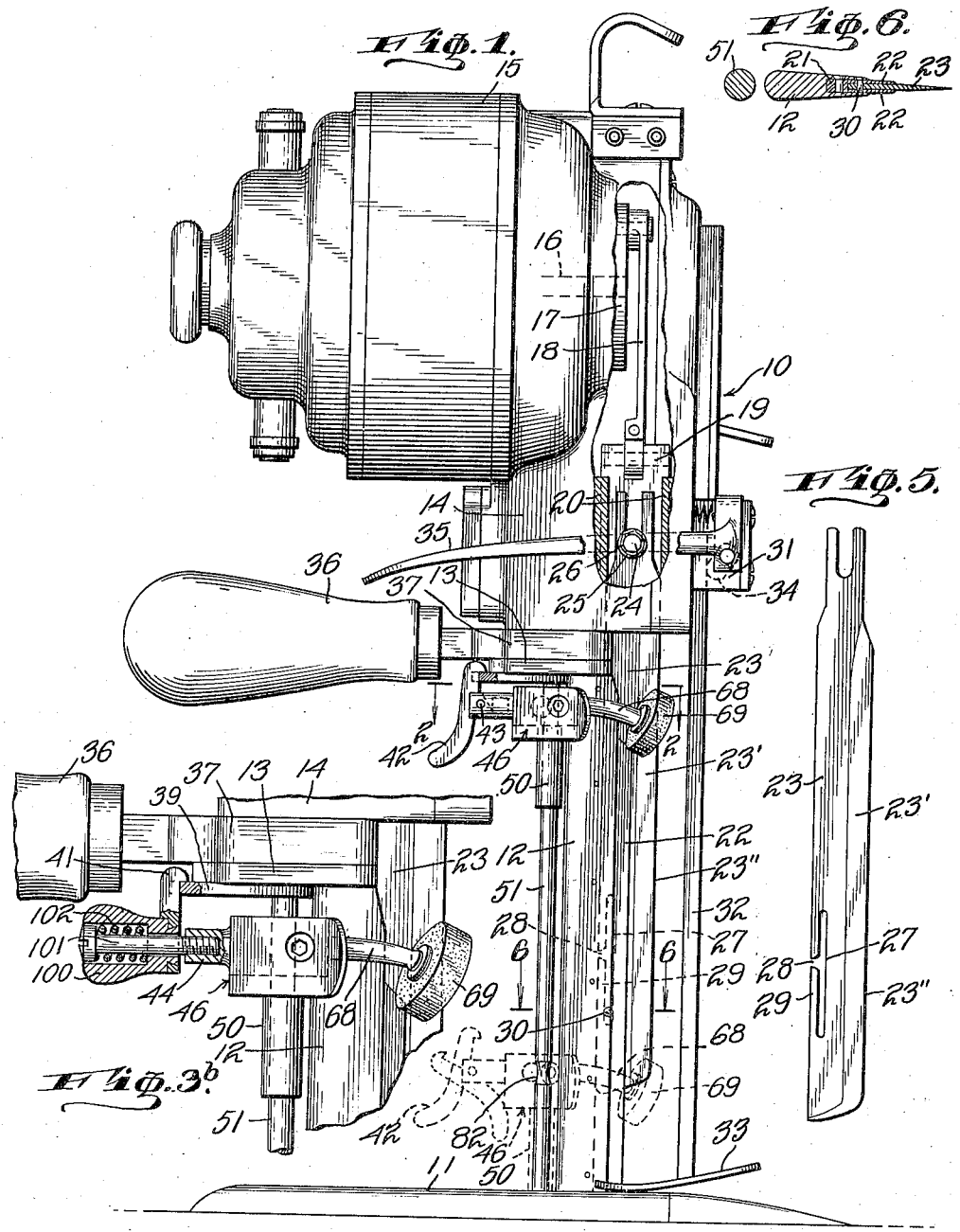
INVENTOR
Samuel Segal
BY
ATTORNEY

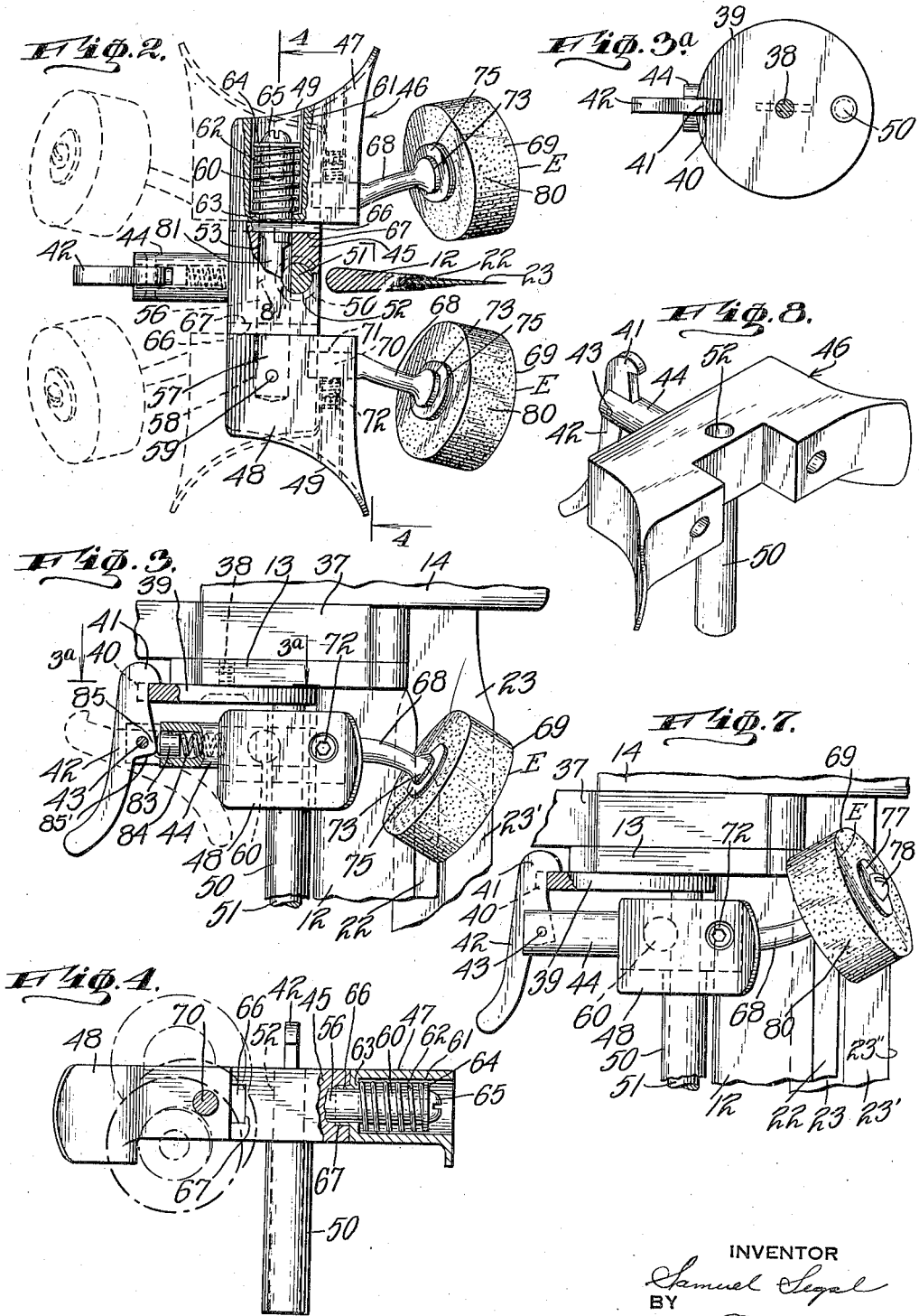

Sept. 6, 1938.  S. SEGAL  2,129,632
CLOTH CUTTING MACHINE
Filed Dec. 7, 1937  4 Sheets-Sheet 3
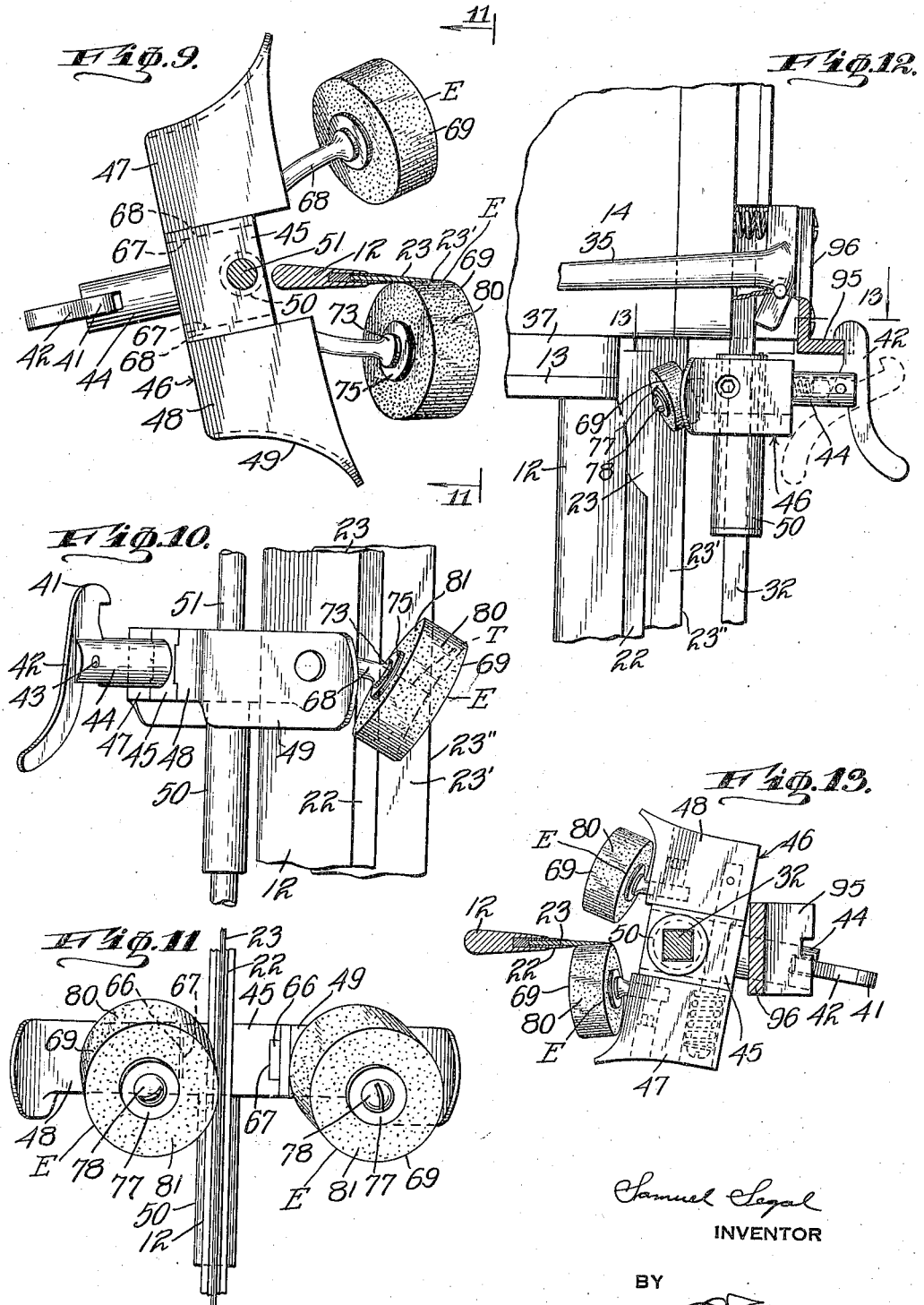

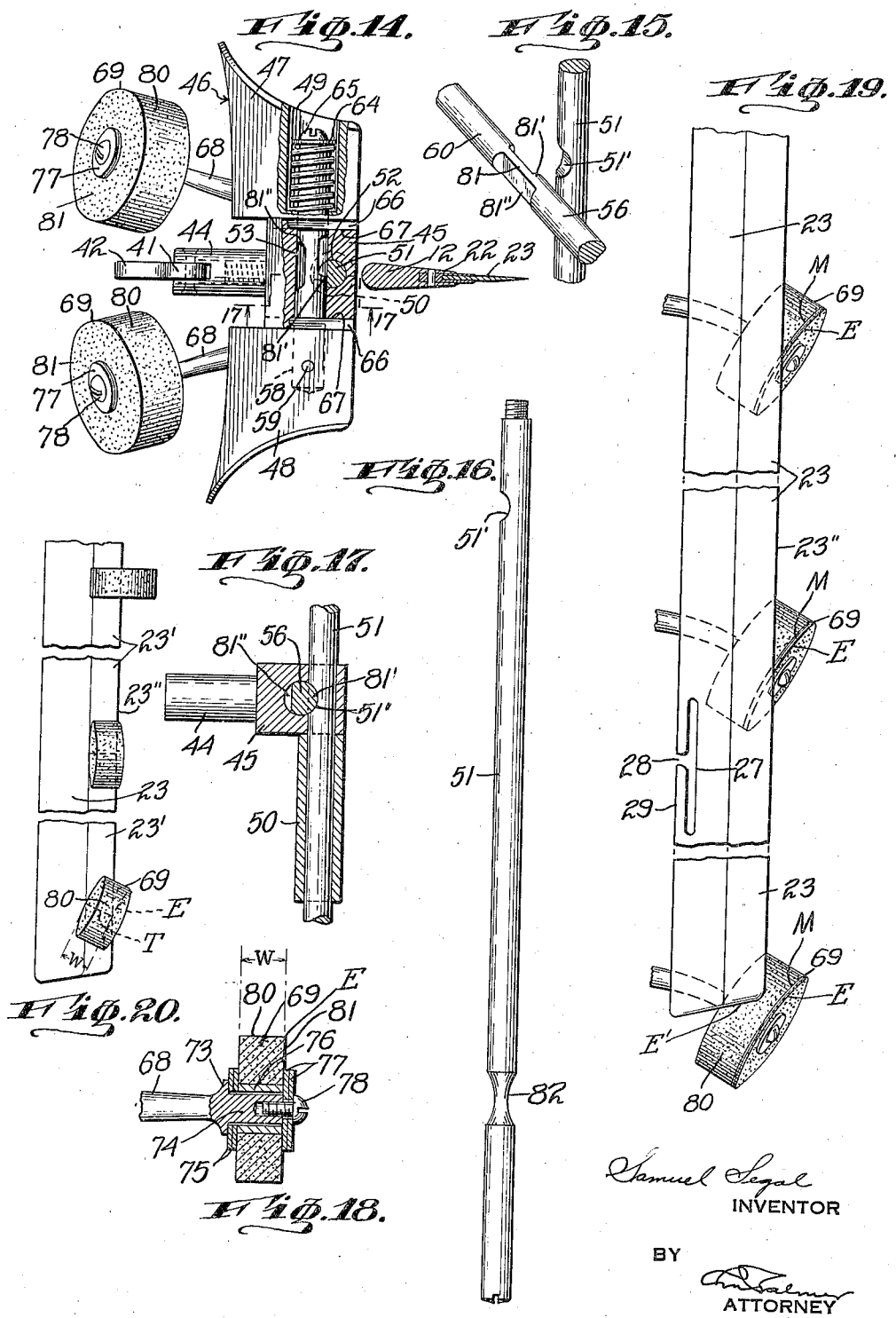

Patented Sept. 6, 1938

2,129,632

UNITED STATES PATENT OFFICE 2,129,632

CLOTH CUTTING MACHINE

Samuel Segal, Brooklyn, N. Y.

Application December 7, 1937, Serial No. 178,474

22 Claims. (Cl. 51—248)

The present invention is concerned with cloth cutting machines and particularly is directed to grinding means for sharpening the blade thereof during its reciprocation to effectively produce a keen cutting edge for readily penetrating a large number of layers of cloth. The object of the invention resides in the provision of a slidably guided carriage having means for supporting rotary sharpening wheels comprising substantially cylindrical rim surfaces disposed at an incline with respect to the edge of the blade and adapted to selectively contact the beveled faces of the blade during its reciprocation and during sharpening operations whereby the beveled surfaces of the blade cause the sharpening wheels to rotate without however cutting into the wheels to deform their desired contour. The invention has as a further object the provision of a novel vertically reciprocable and horizontally swiveled carriage having inclined rotatable grinding wheels straddling an elongated and vertically reciprocable blade, the grinding wheels including exterior cylindrical rim surfaces having an axis of rotation inclined in respect to a plane normal to the vertical cutting edge of the blade upon and during their alternate engagement with the beveled surfaces of the blade, the arrangement being such that the circumferential rim surfaces of the grinding wheels constitute successive tangential lines of contact during alternate engagement of these surfaces with the beveled faces of the blade, and the successive tangential lines of contact are disposed in parallelism in respect to the beveled faces of the blade during alternate engagement of the grinding wheels, and such tangential lines of contact are disposed on a bias in respect to a plane normal to the vertical edge of the blade whereby the cylindrical rim surfaces of the grinding wheels during their alternate engagement with the beveled faces of the blade are in part in advance of the vertical edge of the latter and in part to the rear of the latter whereby corresponding edge portions only of the tangential lines of contact of the cylindrical surfaces of the grinding wheels during their alternate engagement with the beveled faces of the blade are coincident with the vertical cutting edge of the blade during the latter's reciprocation. The invention has as a further object the provision in a cloth cutting machine of swivelled and reciprocable grinding means for quickly and efficiently sharpening a vertically reciprocable and elongated blade to produce a keen cutting edge that actually stands up in practice while effectively cutting relatively heavy cloth loads. The invention has as another important object the provision of novel means for selectively presenting at least the entire width of the circumferential surface of rotary grinding wheels alternately against a beveled face of the reciprocating blade to cause the grinding wheels to wear uniformly whereby the latter always have a contour similar to their original contours and even though the grinding wheels have been worn, the entire width of the circumferential surfaces of the grinding wheels can be brought in alternate engagement with the beveled faces during reciprocation of the blade. The invention further comprehends the provision of a reciprocable carriage having rotary grinding wheels so arranged as to advantageously sharpen the lower part of the blade during its reciprocation. Other objects, advantages, and features of the invention will be more readily understood from the following detailed description considered in connection with the accompanying drawings in which:

Fig. 1 is a side elevational view, shown partly broken away, of the cutting machine according to my invention.

Fig. 2 is a sectional view taken on the line 2—2 of Fig. 1.

Fig. 3 is a fragmentary view of Fig. 1 shown partly in section.

Fig. 3$^a$ is a sectional view taken on the line 3$^a$—3$^a$ of Fig. 3.

Fig. 3$^b$ is a view similar to Fig. 3 however illustrating a modified locking latch for the reciprocable carriage.

Fig. 4 is a sectional view taken on the line 4—4 of Fig. 2.

Fig. 5 is an elevational view of my blade.

Fig. 6 is a sectional view taken on the line 6—6 of Fig. 1.

Fig. 7 is a view along the lines of Fig. 3, however showing the grinding wheels in a different tilted relation.

Fig. 8 is a perspective view of a modified carriage.

Fig. 9 is a transverse sectional view taken at a time when one of the grinding wheels is in contact with the reciprocating blade.

Fig. 10 is a side view of Fig. 9.

Fig. 11 is a front view taken on the line 11—11 of Fig. 9.

Fig. 12 is a fragmentary view in elevation of a modification wherein the swiveled reciprocable carriage is mounted in the front of the blade.

Fig. 13 is a cross sectional view on the line 13—13 of Fig. 12.

Fig. 14 is a view similar to Fig. 2, however illustrating the grinding wheels shifted to the rear of the guard in which case the carriage is locked and prevented from being swiveled and reciprocated.

Fig. 15 is a perspective view of the locking means for the carriage.

Fig. 16 is an elevational view of the spindle for slidably guiding the carriage.

Fig. 17 is a sectional view on the line 17—17 of Fig. 14.

Fig. 18 is a cross sectional view of one of the sharpening wheels and its support.

Fig. 19 shows schematically the various positions of the blade during its reciprocation in respect to one of the grinding wheels and Fig. 20 is a schematic view to illustrate the method of sharpening according to the invention.

Illustrative of the several embodiments disclosed, the cloth cutting machine generally denoted 10 includes a base 11, an upstanding channeled guard 12, a platform 13 fixed to guard 12, a motor support 14 to which is attached electric motor 15 having shaft 16 operatively associated with weighted crank 17 for driving connecting rod 18 which in turn is connected to cross head 19 reciprocably guided in the fixed track 20.

Secured to guard 12 is a socket 21 having sides or leaves 22 between which elongated blade 23 is slidably guided. The upper end of blade 23 is bifurcated and straddles the threaded pin 24 carried by reciprocable cross head 19. Also mounted on pin or shank 24 is washer 25 and the clamping nut 26. The bifurcated portion of the blade is firmly clamped against the cross head by turning nut 26 which in turn moves the washer against the blade. Therefore if the cross be reciprocated, the blade is slidably and reciprocably guided by the guard 21.

To prevent involuntary withdrawal of the blade from the guard the blade is provided with an elongated vertical slot 27 and the communicating tapered gap 28 defining spaced fingers 29 and traversing the guard is the fixed pin 30 which is received in the slot or keyway 27 and serves not only to slidably guide the lower part of the blade but constitutes positioning or locking means to preclude the lower part of the blade from being accidentally withdrawn from the guard.

Attached to the front part of supporting means 14 is a socket 31 slidably guiding rod or spindle 32 which sustains the presser foot 33 which may be held in a selected raised position by a pivoted and spring controlled brake member 34 actuated by the pivoted brake arm 35.

For moving the base of the machine from place to place, a handle 36 is provided. This handle has an extension or bracket 37 which is fixedly interposed between support 14 and platform 13 and fastened to the latter by a set screw 38 is plate 39 (Figs. 3 and 3a) having a notch 40 adapted to receive in part nose or head 41 of locking latch 42 pivoted on pin 43 fixed to post 44 extending from an intermediate swiveled block 45 of a reciprocable and pivoted carriage generally denoted 46 which also includes outer blocks 47 and 48 each of which is provided with a curved finger gripping face 49.

Secured to and depending from the intermediate block 45 of the carriage is a tube 50 which is slidably and rotatably guided by the elongated cylindrical spindle or rod 51 having its terminals fixedly fastened to base 11 and the upper locking plate 39. The intermediate block 45 is also provided with a vertical bore 52 adapted to closely but movably surround vertical spindle 51 and the horizontal bore or opening 53 extending transversely of the intermediate block 45 intersects the vertical bore 52 (Figs. 2 and 14).

Rotatably mounted in the wall of the horizontal opening 53 in the intermediate block 45 is an elongated rod 56 which has one end 57 disposed in recess or bore 58 and fixedly fastened to the outer block 48 by an anchoring pin 59. Consequently if the outer block 48 is rotated, rod 56 will be caused to rotate in the intermediate block or bearing 45.

Rod 56 also extends into the other outer block 49, that is, part 60 thereof projects into the relatively large bore 61 in block 49 and surrounding projecting part 60 is a helicoidal spring 62 which has its inner end seated on the annular shoulder or bearing 63 and its outer end abuts an annular flange 64 fastened to rod 56 by set screw 65 (see Figs. 2 and 4).

Again referring to the outer blocks 47 and 48, it will be observed that each of these members is provided with a lug or key 66 adapted to be received and interlocked with the walls of keyways or slots 67 in the intermediate block 45. In other words, outer blocks 47 and 48 are disconnectably interlocked with the intermediate block 45 and spring 62 so acts between its movable stop or flange 63 and the movable flange 64 to hold lugs 66 interlocked with the walls of slots 67 when the latter are in alinement as shown for example, in Figs. 2 and 4.

By the present arrangement, block 47 may be disconnected from the intermediate block 45 and rotated about rod 56. To this end, block 47 is grasped and pulled in the direction of the longitudinal axis of rod 56 but outwardly. Thus its key 66 is moved out of its slot 67 and shoulder 63 compresses spring 62. With key 66 out of its recess 67, block 47 may be rotated about rod 56. Assuming it has been rotated one hundred and eighty degrees lug 66 is again in alinement with its cooperating recess 67. Thereafter finger pressure is removed from block 47 and the latter automatically moves along the rod 56 due to the release of spring 62 and consequently lug 66 of block 47 enters its recess 67 to interlock therewith.

Of course outer block 48 may also be rotated in respect to the intervening block 45 provided carriage 46 is in the dash line position shown in Fig. 1. If it is assumed that block 48 is interlocked with block 45 as shown by the full lines in Figs. 2 and 4 and it is desired to rotate the block 48 to set it in another position, block 48 is grasped and pulled in a direction of the long axis of rod 56 but outwardly. Thus its lug 66 is removed from its slot 67 in the middle block 45. Now block 48 may be rotated. However rotation of block 48 also causes rod 56 to be rotated therewith which in fact takes place because of the fixed connection between block 48 and rod 56 which is rotatably guided in block 45 and in the outer block 49.

When however rod 56 is bodily displaced by pulling block 48 outwardly as described, flange 64 causes spring 62 to progressively compress at a time when lug 66 of block 48 is being removed from its recess 67. Since therefore block 48 is disconnected from block 48, it may be rotated one hundred and eighty degrees to again permit its lug 66 to be in alinement with its recess 67 after which manual pressure is removed from block 48 and spring 62 again expands, thus bodily linearly retracting rod 56 whereby lug 66 of block 48 is automatically caused to be received in its recess 67 to again interlock therewith.

According to the invention each of the outer blocks is utilized to support an irregularly shaped arm 68 on which is rotatably supported a grinding wheel 69. More particularly however each arm 68 has a relatively large inner portion 70 arranged in a suitable opening 71 in each of the outer blocks and are fixedly secured therein by a concealed but adjustable set screw 72. Each of these arms includes a stop flange 73 (Fig. 18) and a relatively enlarged cylindrical support 74. Metal annular washers 75 are mounted on support 74 and a grinding wheel 69 having fixed therein a bearing 76 is rotatably mounted on support 74. Thereafter a pair of metal annular washers 77 are mounted on support 74 and an adjustable set screw 78 is employed to threadably interconnect with the internal threaded bore of support 74 to properly rotatably guide its respective stone or carborundum wheel 69 between washers 75 and 77.

Each of the arms 68 however are of a peculiar shape. With the carriage in a neutral position as shown in Fig. 2, these arms diverge outwardly. They are also curved downwardly as clearly shown in Fig. 3, the arrangement being such, that when each of the grinding wheels 69 strikes a beveled face 23' of the reciprocable blade 23, a tangential line of contact T (Fig. 20) of the full width W (Figs. 10, 18 and 20) of the cylindrical rim surface 80 of the wheels engages an adjacent beveled face 23' but at an incline or bias in respect thereto as shown. Thus the progressive tangential lines of contact T during grinding are always parallel to an adjacent beveled face 23'.

During alternate engagement of the cylindrical rim surfaces of the grinding wheels with the beveled faces of the blade, each grinding wheel meets a beveled face of the blade on a bias in respect to a plane normal to the vertical cutting edge 23'', thus a part of the grinding wheel while the latter is engaging a companion beveled face of the blade overhangs the vertical cutting edge 23'' while a diametrically opposed part of this grinding wheel extends to the rear of this cutting edge but only the marginal portion M of the rim surface of a grinding wheel contacts the edge 23'' of the blade. Stated in another way, the successive lines of contact of the cylindrical rim surface of each wheel meet a beveled face of the blade at an angle in respect to a plane normal to the vertical cutting edge 23'' but parallel to this beveled face and the edge 23'' of the blade is ground only by the very narrow zone M of the wheels, said zone may be considered as the circumferential edge E of a cylindrical surface of the wheels, the zones in Fig. 19 having been shown slightly exaggerated and enlarged. Hence it will be apparent that during grinding circumferential edge E only of a cylindrical rim surface of a grinding wheel is coincident with the knife edge 23''. This of course holds true for both of the sharpening wheels as they are rotated by the reciprocating blade upon their alternate engagement with the latter. By this arrangement the edge of the blade cannot cut into the grinding wheels to form irregularities therein.

In actual practice, it has been discovered, that the grinding wheels during grinding, also retain a shape always similar to their original shape and because of the biased relation of the rim cylindrical surface of each grinding wheel in respect to the beveled faces of the blade, the grinding wheels wear uniformally and are not deformed irregularly or cut into to form grooves, ridges, or other undesirable shapes and since the cutting edge of the blade is always met on a bias by the wheels, a desirable and particular keen cutting edge is formed adapted to penetrate and cut a stack of cloth of appreciable thickness.

As shown in Figs. 1 to 3 and 9 to 11 inclusive, the slidable carriage 46 has its outer blocks 47 and 48 interlocked with the intermediate block 45 to prevent setting of the grinding wheels to the rear of the guard 12 and if it is desired to sharpen the blade the operator grasps manipulating portions 49 of the outer blocks and reciprocates the carriage along the spindle 51 at the rear of guard 12 at the same time causing the carriage to be oscillated bodily to permit first one grinding wheel to contact the blade and then the other grinding wheel to contact the blade during the latter's reciprocation. Oscillation of the carriage is brought about by swiveling or rotating the intermediate block 45 about spindle 51 as is well understood.

Having completed the sharpening of the blade the grinding wheels may be swung to be at the rear of the guard 12 as indicated by the dash lines in Fig. 2. This can be accomplished provided the attenuated portion 81 (Figs. 2 and 14) of rod 56 is disposed in alinement with the reduced or attenuated part 82 of spindle 51 (Figs. 1 and 16) and such arrangement takes place automatically when the slidable sleeve 50 of the carriage strikes base 11 at which time both of the outer blocks 47 and 48 may be unlocked from the intermediate block, rotated, and again locked to the intermediate block, thus positioning the grinding wheels to the rear guard 12 as shown in Fig. 14.

With the grinding wheels at the rear of the guard, the carriage may be moved upwardly to cause rod 56 to automatically interlock with wall of groove 51' of spindle 51. More particularly portion 81' thereof enters groove 51' and therefore rod 56 cannot be rotated unless of course it is first slidably displaced in respect to the intermediate block to remove portion 81' out of notch or groove 51' at which time both of the outer blocks may be rotated. In the position of the blocks shown in Fig. 14, the carriage is also prevented from being swiveled or reciprocated and therefore stays in a neutral position.

If desired, the grinding wheels after being employed for sharpening need not be swung out of the way but may be situated at the upper part of the guard and this is carried into effect by moving the carriage upwardly, causing nose or cam 41 to strike locking plate 39 and be displaced slightly outwardly against the resistance offered by the slidable tumbler 83 (Fig. 3) controlled by spring 84 disposed within extension 44 and thereafter step over plate 39 and be received in notch 40 to overlap plate 39 as shown in Figs. 3 and 3ª and 7 and thus interlock therewith, which relation is maintained by the action of tumbler 83 against shoulder 85 of the pivoted latch 42.

In effect, latch 42 interlocking with plate 39 constitutes a stop to prevent downward displacement and swiveling of the carriage when the grinding wheels are arranged as in Fig. 1.

If latch 42 be disconnected from plate 39 and when portion 81' of the slidable and rotatable rod 56 (Fig. 2) is free of spindle 51 if the latter is encompassed by the relatively deep recess 81'' (Fig. 15), rod 56 is not locked to the spindle at this time and therefore the carriage may be reciprocated along the spindle without danger of it being locked when it reaches the elevation of notch 51' of course when the grinding wheels are at the front of the guard. However under such circumstances the carriage may be held in an elevated position (Fig. 1) and prevented from swiveling by latch 42 which if desired may be utilized as a handle to oscillate the carriage when latch 32 is unlocked.

In the form illustrated in Fig. 2, the carriage 46 includes three blocks and if desired these may be merged into a single block as shown in Fig. 8 in which case the grinding wheels cannot be swung to the rear of the guard but the carriage however may be locked by latch 42.

The grinding action of the sharpening wheels 69 previously described in connection with Figs. 9 and 10, of course would also be possible in case the arms 68 of the reciprocable carriage be positioned about their longitudinal axis one hundred and eighty degrees from their position shown in Fig. 3, that is, to curve upwardly as shown in Fig. 7 instead of downwardly. In other aspects, the form according to Fig. 7 is along the lines shown in Figs. 3 and 9 to 11 inclusive.

According to the form illustrated in Figs. 12 and 13, the sleeve 50 fixedly extends through the intermediate block of carriage 46. This sleeve however is rotatably and slidably mounted on the square shaped rod 32 carrying foot 33 not shown in Fig. 13 but illustrated in Fig. 1. The carriage in Fig. 12 may be locked in a raised position by the spring controlled latch 42 adapted to removably engage a horizontal ledge 95 of a fixed bracket 96 carried by the motor support 14. In the case of the form according to Figs. 12 and 13, blocks 47 and 48 may be disconnected from the intermediate block 45 and rotated to be disposed in sharpening relation in respect to the blade as shown in Fig. 13 or be thrown or swung out of the way of the blade as described in connection with the form shown in Fig. 1.

In Fig. 20 several positions of sharpening wheels in respect to the beveled face of the blade are shown. Where the wheel is horizontal or vertical, sharpening of the blade cannot take place. However with the inclined position of the wheels in respect to the beveled face and where the rim surface contacts the latter tangentially but in such manner that its circumferential edge E is coincident with the edge 23" of the blade, a relative keen cutting edge may be obtained. Such inclined positions of the grinding wheels have been indicated in Fig. 19 and in the latter which is schematic for actually only one grinding wheel is employed on each side of the blade, the circumferential edge E is always coincident with the vertical cutting edge 23" during grinding and regardless of the position of the carriage and/or blade except however when the lower edge E' of the blade is sharpened, and it should be appreciated that the lower inclined edge E' of the blade may be reached and sharpened by the grinding wheels during reciprocation and oscillation of the carriage and reciprocation of the blade (Fig. 19) in which case edge E' is ground by the rim surface 80 of the wheels.

Referring now to Fig. 3, the latch 42 in its full line position, is shown locked to fixed plate 39. Such action is maintained by the spring actuated tumbler 83 acting against shoulder 85. However this latch may be held in an inclined and non-locked relation as illustrated by the dash line in Fig. 3 and in this connection attention is directed to shoulder 85' which when latch 42 is unlocked is acted upon by tumbler 83 and consequently latch 42 which may be considered as a pivoted handle can be held in a non-locking but inclined position.

In the form according to Fig. 3ᵇ, manipulator or latch handle 100 is slidably mounted and guided on the shank of stud 101. Projecting upwardly and secured to the handle is the dog or catch 41 which is adapted to interlock with fixed plate 39 in the same manner as shown in Fig. 3, to prevent swiveling and downward displacement of the carriage 46.

Catch 41 is held in an interlocked relation with plate 39 by the action of spring 102 which normally urges handle 100 towards the carriage. If therefore the carriage be disconnected from plate 39 and moved towards and against the latter, catch 41 becomes automatically interlocked with plate 39, as is well understood.

Without further analysis, the foregoing disclosure will so fully reveal the gist of the present invention that others can by applying current knowledge readily adapt it to various applications without omitting certain features, that from the standpoint of the prior art, fairly constitute the essential characteristics of the generic and specific aspects of the invention and therefore such adaptations should and are intended to be comprehended within the meaning and range of equivalency of the following claims.

I claim:

1. In combination, a spindle, a carriage comprising a socket slidably and rotatably guided by said spindle, a rod slidably and rotatably sustained by said socket, a block fixed to said rod, a block rotatably mounted on said rod, disconnectable interlocking means between said blocks and socket, spring means for normally holding said blocks interlocked with said socket, said spindle having means adapted to receive a portion of said rod to prevent rotation of the latter, said rod having means adapted to clear said spindle to permit rotation thereof relative to said spindle, a fixed member, arms carried by said carriage, grinding wheels rotatably mounted on said arms, and a latch cooperating with said fixed member to prevent displacement of said carriage longitudinally of said spindle.

2. In combination, a blade having beveled faces defining a vertical feathered edge, means for reciprocating said blade, vertically inclined grinding wheels straddling said blade and comprising substantially cylindrical rim surfaces, a carriage having means for supporting said wheels to present successive tangential lines of said surfaces substantially parallel to and in contact with said faces and out of normal in respect to said edge whereby edges only of said surfaces are severally coincident with said feathered edge, means for slidably and swingably sustaining said carriage, a latch movably carried by said carriage, and fixed means independent of said carriage for disconnectably locking said latch.

3. In combination, a blade having beveled faces defining a vertical feathered edge, means for reciprocating said blade, vertically inclined grinding wheels straddling said blade and comprising substantially cylindrical rim surfaces, a carriage having means for supporting said wheels to present successive tangential lines of said surfaces substantially parallel to and in contact with said faces and out of normal in respect to said edge whereby edges only of said surfaces are severally coincident with said feathered edge, means for slidably and swingably sustaining said carriage, a latch, means sustained by said carriage for rotatably and slidably supporting said latch, fixed means independent of said carriage for disengageably locking said latch, and spring means yieldingly and normally urging said latch towards said fixed means.

4. In a cloth cutting machine, a reciprocable blade having vertical and beveled faces defining a vertical edge, vertically disposed guide means arranged rearwardly of said blade, a horizontally swingable and vertically slidable carriage rotatably and reciprocably mounted on said guide means, rotatable grinding wheels sustained by said carriage and straddling said blade and having substantially continuously curved rim surfaces defining successive tangential lines of contact upon alternative engagement of said surfaces with said faces, said successive lines of contact upon engagement of said wheels severally and alternatively against said faces being disposed at an incline in respect to a plane normal to said vertical edge, said surfaces each having a continuous edge disposed at an incline in respect to said vertical edge and constituting corresponding edge portions of said lines severally coincident only with said vertical edge upon engagement of respective surfaces against said faces during reciprocation of said blade.

5. In a cloth cutting machine, a reciprocable blade having vertical and beveled faces defining a vertical edge, vertically arranged guide means, an oscillatable and reciprocable carriage rotatably and slidably guided by said guide means and having arms straddling said blade, a grinding wheel rotatably mounted on each of said arms, said wheels each having a substantially cylindrical rim surface defining successive tangential lines of contact with an adjacent beveled face of said blade upon engagement therewith, said successive lines of contact each being disposed at an incline in respect to a plane normal to said vertical edge and each of said surfaces having a continuous edge disposed at an incline in respect to said vertical edge and constituting corresponding portions of said lines severally coincident only with said vertical edge upon engagement of said surfaces alternately against said faces.

6. In combination, a movable blade having vertical and beveled faces defining a vertical edge, a movable carriage having arms straddling said blade, means rotatably and reciprocably guiding said carriage relative to said blade, a grinding wheel rotatably mounted on each of said arms, said wheels each having a substantially circular rim surface defining successive tangential lines of contact with an adjacent beveled face of said blade upon engagement therewith, said successive lines of contact each being disposed at an incline in respect to a plane normal to said vertical edge and each of said surfaces having a circular edge disposed at an incline in respect to said vertical edge and constituting corresponding portions of said lines severally coincident only with said vertical edge upon engagement of said surfaces alternately against said faces during movement of said blade.

7. In a cloth cutting machine, a reciprocable blade having beveled faces defining a vertical edge, means for reciprocating said blade, grinding wheels vertically inclined in respect to a plane normal to said edge and straddling said faces and comprising substantially circular surfaces, a swiveled carriage having spaced means for rotatably supporting said wheels to present successive tangential lines of said surfaces substantially parallel to and in contact with said faces and at an incline in respect to said plane to present corresponding and successive edge portions only of said lines coincident with said vertical edge during reciprocation of said blade, and a rod at the rear of and spaced from said blade for rotatably and reciprocably guiding said carriage.

8. In a cloth cutting machine, a blade having beveled faces defining a vertical edge, means for reciprocating said blade, grinding wheels vertically inclined in respect to a plane normal to said edge and straddling said blade and comprising substantially cylindrical rim surfaces, a reciprocable carriage having diverged arms for rotatably supporting said wheels to present successive tangential lines of said surfaces at an incline in respect to said plane to present corresponding edges only of said surfaces coincident with said vertical edge, and vertically arranged means for slidably guiding said carriage vertically of said blade and swingably but horizontally guiding said carriage.

9. In combination, a blade having beveled faces defining a vertical edge, means for reciprocating said blade, grinding wheels inclined in respect to a plane normal to said edge and straddling said blade and comprising substantially cylindrical rim surfaces, a carriage having means for rotatably supporting said wheels to present successive tangential lines of said surfaces substantially parallel to and in contact with said faces and at an incline in respect to said plane to severally present edge portions only of said surfaces against said vertical edge on reciprocation of the latter and on alternate engagement of said surfaces with said faces, and means for rotatably and slidably supporting said carriage relative to said blade.

10. In a cloth cutting machine, a reciprocable blade having a vertical edge, means for reciprocating said blade, grinding wheels inclined in respect to a plane substantially normal to said edge and straddling said blade and having substantially cylindrical rim surfaces defining successive tangential lines of contact in respect to and with said blade upon engagement therewith and disposed at an incline in respect to said plane, a carriage having spaced and diverged arms for rotatably supporting said wheels, and means for slidably and swingably supporting said carriage to permit the latter to be vertically reciprocated and horizontally swiveled relative to said blade for presenting selectively a continuous edge portion only of said surfaces coincident with said vertical edge.

11. In a cloth cutting machine, a reciprocable blade having beveled faces defining a vertical edge, grinding wheels inclined in respect to a plane substantially normal to and straddling said faces and each having a substantially circular exterior rim surface, a carriage having spaced arms for rotatably supporting said grinding wheels to present selectively said surfaces to define tagential lines of contact against said faces but at an incline in respect to said plane on reciprocation of said blade and severally rotate said wheels and present an edge portion only of said surfaces in contact and coincident with said vertical edge, a guide, said carriage having a bore cooperating with said guide to guide rotational and rectilinear displacement of said carriage, and locking means to prevent displacement of said carriage relative to said blade.

12. In a cloth cutting machine, a reciprocable blade having beveled surfaces defining a vertical edge, rotatable grinding wheels having substantially circular exterior rim surfaces inclined in respect to a plane normal to said edge, a manually controlled vertically reciprocable and horizontally swingable carriage having spaced arms for rotatably supporting said wheels to position tangentially parts of said surfaces substantially parallel to said faces to be in contact therewith and biased in respect to said plane to severally permit corresponding edge portions of said surfaces during alternate contact of the latter with said faces to be coincident with said vertical edge on the latter's reciprocation, fixed means for rotatably and reciprocably guiding said carriage, a movable latch carried by said carriage, and means disconnectably locking said latch to prevent movement of said carriage relative to said blade.

13. In combination, a blade having beveled faces defining a feathered edge, a carriage, means for vertically reciprocating and swingably guiding said carriage, diverged arms sustained by said carriage, a grinding wheel inclined in respect to a plane normal to said edge and rotatably mounted on each of said arms, said grinding wheels having substantially circumferential rim surfaces for alternately contacting said surfaces and constituting successive lines of contact positioned substantially parallel to said beveled faces and disposed at an incline in respect to said plane to rotate said wheels to permit circumferential edge portions of said surfaces to be severally coincident with said vertical edge on reciprocation of said blade.

14. In combination, a blade having a feathered edge, a guard, means for reciprocating said blade relative to said guard, a carriage, a support, means secured to said support for movably guiding said carriage, horizontally diverged arms sustained by said carriage, and rotatable grinding wheels each inclined in respect to a plane normal to said edge and mounted on said arms and comprising substantially circular rim surfaces adapted to be selectively and alternatively brought into engagement with said blade and on a bias in respect to said plane and in part forwardly overhanging said blade and in part extending to the rear of said blade whereby upon contact of said surfaces severally with said blade during reciprocation of the latter said wheels are caused to rotate whereby corresponding marginal edge portions only of said rim surfaces are alternatively coincident with said feathered edge.

15. In combination, a movable blade having a vertical edge, a carriage comprising outer blocks and an inner block in horizontal alinement with said outer blocks, a rod, one of said outer blocks and said inner block having means rotatably and slidably guiding said rod, said inner block comprising sides each including a recess, said outer blocks having projecting lugs to interlock with the walls of said recesses, helicoidal spring means for normally holding said outer blocks interlocked with said inner block, said outer blocks and rod adapted to be shifted outwardly in respect to said inner block for disconnecting said outer blocks from said inner block to permit rotation of the outer blocks relative to said inner block, arms carried by said outer blocks, and a rotatable grinding wheel rotatably carried by each of said arms and each having an axis of rotation inclined in respect to a plane normal to said edge upon contact of said wheels severally with said blade.

16. In combination, a reciprocable blade having beveled faces defining a vertical edge, a vertically reciprocable and horizontally swingable carriage, arms sustained by said carriage and straddling said blade, and grinding wheels rotatably sustained by said arms and inclined in respect to a plane normal to said edge upon alternate contact of said wheels with said faces to rotatably present portions of said wheels severally and when in engagement with one of said faces in advance of said edge and other portions thereof to the rear of said edge, said grinding wheels having substantially cylindrical surfaces defining successive tangential lines of contact upon said alternate engagement of said surfaces with said faces and during rotation of said wheels, said lines of contact upon said engagement of said surfaces with said faces being disposed substantially parallel to said faces and biased in respect to said plane to permit corresponding edge portions only of said surfaces to be severally coincident with said vertical edge during reciprocation of said blade.

17. In a cloth cutting machine, a vertically reciprocable blade having a vertical beveled face comprising a vertical free edge, a fixedly vertically arranged guide, a carriage rotatably and reciprocably guarded by said guide, a grinding wheel rotatably carried by said carriage and having an axis of rotation inclined in respect to a plane normal to said edge, said wheel having an exterior circumferential surface constituting successive tangential lines of contact during engagement of said wheel with said face during reciprocation of said blade, said tangential lines being severally disposed substantially parallel to said face and on a bias in respect to said plane during rotation of said wheel upon engagement of said surface with said face, said surface during engagement with said face being in part disposed in advance of said edge and in part to the rear of the latter whereby corresponding edge portions only of said lines are severally coincident with said edge during engagement of said surface with said face.

18. In a cloth cutting machine, a reciprocable blade having beveled faces defining a vertical edge, a horizontally swiveled and rectilinearly movable carriage, horizontally spaced arms sustained by said carriage and straddling said blade, grinding wheels rotatably sustained by said arms and inclined in respect to a plane normal to said edge upon alternate contact of said wheels with said faces to rotatably present portions of said wheels when contacting said faces severally in advance of said edge and other portions thereof to the rear of said edge, said grinding wheels having curved and exterior surfaces defining successive tangential lines of contact upon said alternate engagement of said surfaces with said faces and during rotation of said wheels, said lines of contact upon said engagement of said surfaces with said faces being alternatively disposed substantially parallel to said faces and biased in respect to said plane to permit corresponding edge portions only of said surfaces to be severally and alternatively coincident with said vertical edge during reciprocation of said blade, means for reciprocating said blade, and fixed guide means carried by said machine for rotatably and rectilinearly guiding said carriage.

19. In combination, a reciprocable blade having beveled faces defining a vertical edge, a vertically reciprocable and horizontally swingable carriage, a vertically arranged guide for movably guiding said carriage, arms sustained by said carriage and straddling said blade, grinding wheels rotatably sustained by said arms and inclined in respect to a plane normal to said edge upon contact of said wheels alternately with said faces to rotatably present portions of said wheels in advance of said edge and other portions thereof to the rear of said edge, said grinding wheels having substantially cylindrical surfaces defining successive tangential lines of contact upon engagement of said surfaces with said faces and during rotation of said wheels, said lines of contact upon engagement of said surfaces with said faces being disposed substantially parallel to said faces and biased in respect to said plane to permit corresponding edge portions only of said surfaces to be severally coincident with said vertical edge during reciprocation of said blade, a pivoted latch carried by said carriage, and spring controlled means for holding said latch in a set position.

20. In combination, a reciprocable blade having beveled faces defining a vertical edge, a vertically reciprocable and horizontally swingable carriage, arms sustained by said carriage and straddling said blade, grinding wheels rotatably sustained by said arms and inclined in respect to a plane normal to said edge upon alternate contact of said wheels with said faces to rotatably and alternately present portions of said wheels in advance of said edge and other portions thereof to the rear of said edge, said grinding wheels having substantially cylindrical surfaces defining successive tangential lines of contact upon alternate engagement of said surfaces with said faces and during rotation of said wheels, said lines of contact upon said engagement of said surfaces with said faces being disposed substantially parallel to said faces and biased in respect to said plane to permit corresponding edge portions only of said surfaces to be severally coincident with said vertical edge during reciprocation of said blade, a pivoted latch carried by said carriage, slidable tumbler means, spring means cooperating with said tumbler means to hold said latch in a set position, and means independent of said carriage for interlocking with said latch to prevent displacement of said carriage vertically of said blade.

21. In combination, a reciprocable blade having beveled faces defining a vertical edge, a vertically reciprocable and horizontally swingable carriage, arms sustained by said carriage and straddling said blade, grinding wheels rotatably sustained by said arms and inclined in respect to a plane normal to said edge upon alternate contact of said wheels with said faces to rotatably and alternately present portions of said wheels in advance of said edge and other portions thereof to the rear of said edge, said grinding wheels having substantially cylindrical surfaces defining successive lines of contact upon alternate engagement of said surfaces with said faces and during rotation of said wheels, said lines of contact upon said engagement of said surfaces with said faces being disposed substantially parallel to said faces and biased in respect to said plane to permit corresponding edge portions only of said surfaces to be severally coincident with said vertical edge during reciprocation of said blade, a swingable latch, means carried by said carriage for pivotally sustaining said latch, spring controlled means cooperating with said latch to hold the latter is a set position, and means disconnectably associated with said latch to prevent or permit displacement of said carriage longitudinally of said blade.

22. In combination, a reciprocable blade having beveled faces defining a vertical edge, a vertically reciprocable and horizontally swingable carriage, arms sustained by said carriage and straddling said blade, grinding wheels rotatably sustained by said arms and inclined in respect to a plane normal to said edge upon alternate contact of said wheels with said faces to rotatably and alternately present portions of said wheels in advance of said edge and other portions thereof to the rear of said edge, said grinding wheels having substantially cylindrical surfaces defining successive tangential lines of contact upon alternate engagement of said surfaces with said faces and during rotation of said wheels, said lines of contact upon said engagement of said surfaces with said faces being disposed substantially parallel to said faces and biased in respect to said plane to permit corresponding edge portions only of said surfaces to be severally coincident with said vertical edge during reciprocation of said blade, and disconnectable locking means to prevent displacement of said carriage longitudinally of said blade.

SAMUEL SEGAL.